July 29, 1947.
R. W. BROWN
2,424,914
PIVOTAL JOINT
Filed Aug. 21, 1942
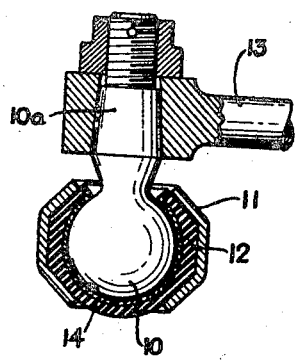
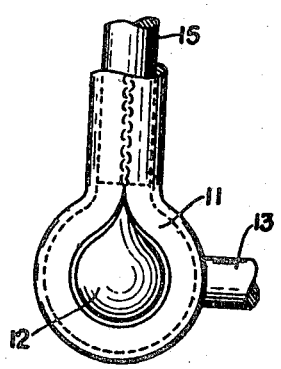
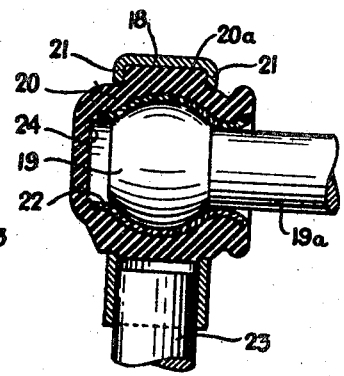
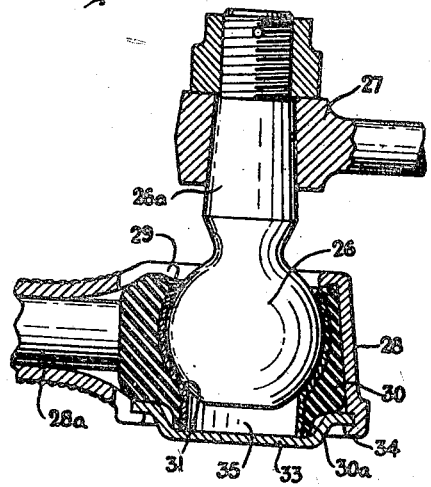
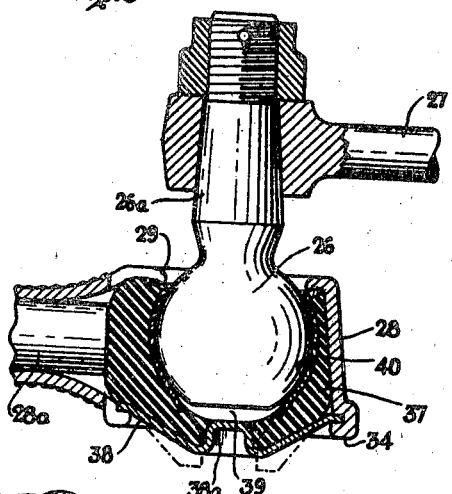
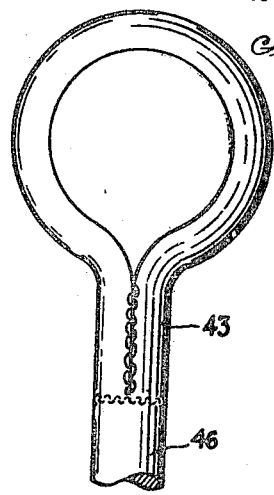
INVENTOR
ROY W. BROWN
BY Ely & Frye
ATTORNEYS Patented July 29, 1947

2,424,914

UNITED STATES PATENT OFFICE 2,424,914

PIVOTAL JOINT

Roy W. Brown, Akron, Ohio, assignor to The Firestone Tire & Rubber Company, Akron, Ohio, a corporation of Ohio Application August 21, 1942, Serial No. 455,677

7 Claims. (Cl. 287—85)

This invention relates to pivotal joints, and more especially it relates to pivotal joints of the insulating type that comprise resilient bushings provided with permanently lubricated surfaces.

The application is a continuation in part of my copending application for Letters Patent, Serial No. 347,724, filed July 26, 1940, now matured into Patent No. 2,324,984, issued July 20, 1943.

The chief objects of the invention are to provide an improved pivotal joint that may be inexpensively manufactured; that consists of relatively few parts; that will not require adjustment during its useful life; that will have insulating properties; that will have a controllable amount of shock absorbing properties; to provide a pivotal joint of the ball and socket type that will enable relative movement of the connected parts in the three planes at right angles to each other and rotational movement; to provide yieldingly resilient centering means for the ball which will prevent the shell or casing of the socket element from having metal to metal contact with the shank of the ball, to the end that excessive wear and noise are obviated; to provide a joint of the character mentioned that will be substantially tight against dirt, water, and other foreign matter encountered in normal use; and to provide a pivotal joint having a dynamic coefficient of friction greater than the static coefficient, that is, one in which less force is required to initiate movement of the joint than is necessary to maintain such movement. Other objects will be manifest as the description proceeds.

Of the accompanying drawing:

Fig. 1 is an axial sectional view of one embodiment of the invention;

Fig. 2 is a plan view thereof as seen in the direction of the axis thereof;

Fig. 3 is a diametric section through another embodiment of the invention;

Fig. 4 is a diametric section through another embodiment of the invention;

Fig. 5 is a diametric section through still another embodiment of the invention;

Fig. 6 is a diametric section through yet another embodiment of the invention; and Fig. 7 is a plan view of the outer shell or housing element of the structure shown in Fig. 6.

Referring now to Fig. 1 and Fig. 2 of the drawing, there is shown a pivotal joint comprising an inner bearing member 10 shown as a ball or sphere, an outer housing 11, and an intermediate bushing 12. The ball member 10 may take various forms so long as it retains a substantially spherical bearing surface, and the outer housing or casing 11 may also be of various forms, alternative constructions being disclosed in detail hereinafter. The bearing member 10 has an integral stud 10a that may be attached to an eye member 13, the latter constituting one of the two elements that are connected by the pivotal joint. The bushing 12 is composed of resilient rubber, or composition having substantially similar physical properties, and is provided with a flexible fabric lining 14 that is impregnated with a suitable lubricant. The bushing 12 is molded and vulcanized to proper form, the lining 14 being vulcanized to the inner face of the bushing. Said inner face of the bushing is complemental to the contour of the bearing member 10, the bushing being designed to cover substantially all of the spherical portion of said member, except the stud portion 10a thereof. The external shape of the bushing 12 is substantially complemental to the contour of the inner face of the housing 11.

The casing or housing 11 preferably is made of a sheet metal stamping that is formed by pressing operations into a loop of the shape shown in Fig. 2 and of the cross-sectional shape shown in Fig. 1. The ends of the stamping are brought together and welded to a member 15 which is shown as a solid rod, but which may be hollow tubing if desired, said rod constituting the element to which member 13 is connected by the pivotal joint. The inside diameter of the opening extending through the loop-casing 11 is smaller than the outside diameter of the ball 10 so as to prevent removal of the latter from the finished joint. The bushing 12 may be of such normal external size as to be placed under compressive stress by the casing 11 around it.

In the embodiment of the invention shown in Fig. 3 the outer housing, designated 18, is a metal stamping of U-shape cross section. The general construction is somewhat similar to that previously described, except that the relative shape and size of the outer housing and the ball element 19 is such that the latter has a "snap" assembly fit within a bushing 20 that is disposed between the ball and housing. The housing 18 is of loop formation, and its marginal portions are inwardly turned to provide flanges 21, 21, the housing as a whole being united with a member 23 constituting one of the elements connected by the pivotal joint. The diameter of the ball is smaller than the inside diameter of the inturned flanges 21 by an amount that is a little less than the thickness of the bushing 20 at the region of the flanges. Therefore, when the ball is "snap" fitted into or out of the open end of the bushing, the part of the latter around the shank 19a of the ball will be stretched and also compressed, between the inner edge of the flange and the ball, as the latter passes the flange. The bushing 20 is formed with a central circumferential rib or flange 20a that engages the inner or confronting lateral faces of the flanges 21 of the housing and is thereby held against displacement axially of the housing. The bushing 20 is somewhat similar to that shown in Fig. 1 in that it is provided with a fabric lining 22 that is impregnated with a suitable lubricant. The ball 19, on the side thereof opposite the shank or stem 19a, is flattened, and the bushing opposite said flattened region is so shaped as to provide a void or well 24 in which a supply of lubricant may be placed before the ball is mounted in the bushing, the fabric lining 22 extending into said well.

In the embodiment of the invention shown in Fig. 4, there is shown a substantially spherical ball member 26 that is integrally formed with a tapered and threaded stud 26a for attachment to an eye member 27. The ball 26 is tangentially flattened perpendicular to the axis of the stud 26a on the side of the ball diametrically opposite said stud. The joint comprises an outer housing member 28 of sheet metal, and the same is bent into a loop, as in the previously described embodiments, and welded to a rod 28a that is pivotally connected to the eye member 27 by means of the joint. The loop or housing 28 is axially tapered, and at its small end is formed with an inturned circumferential flange 29.

Mounted between the housing 28 and the ball 26 is a flexible, annular rubber bushing 30 having its inner face provided with fabric lining 31 that is impregnated with lubricating material. The bushing 30, with lining 31 attached thereto, is molded and vulcanized to the desired shape, the peripheral surface of the bushing being shaped substantially complemental to the inner circumferential surface of the housing loop 28, the lining 31 extending onto the end face of the bushing, at the smaller end thereof, so as to abut the housing flange 29 in the assembled condition of the joint. The inner surface of the bushing 30 is shaped complemental to the ball element 26, but has an axial extension 30a at the larger end thereof, the lining 31 extending into said extension.

At its larger end the annular housing is closed by a disc 33 that is centrally and outwardly dished. The disc is permanently assembled with the housing by means of a flange 34 formed on the large end of the housing, said flange being pressed over the marginal portion of the disc. The arrangement is such as to provide a recess or void 35 within the housing, and in this void a quantity of lubricant may be placed during the assembling of the joint. Preferably the bushing 30 is slightly longer than the space that it occupies in the finished joint, so that the rubber of the bushing is placed under compressive stress by the application of the disc 30. This increases the friction between the housing and the bushing, and assures that the latter will not move relatively of the housing during service. The disc 33 also serves to exclude dirt and other foreign matter from the working parts of the joint.

The embodiment of the invention shown in Fig. 5 is similar to that shown in Fig. 4, the ball element 26 and 26a, the eye member 27, and the housing member 28 being identical with similarly designated elements previously described. The flexible rubber bushing 37, that is positioned between the ball member 26 and the housing 28, is molded and vulcanized to the initial shape as indicated by the broken lines. The bushing is retained in the joint by means of a metal disc 38 that is permanently secured in the large end of the tapered housing by the peening over of the housing flange 34 onto the marginal portion of the disc. The disc 38 is formed with a cylindrical axial re-entrant 38a that engages the adjacent marginal portion of the bushing 37 in the assembled joint, the bushing thereby being deformed to the shape shown in full lines in the drawing, and put under compressive stress, whereby relative movement between the bushing and housing is obviated.

The arrangement is such that there is a void 39 within the structure contiguous with the flat surface of the ball member 26, in which void a supply of lubricant may be placed, during assembly of the joint, to lubricate the fabric lining 40 of the bushing 37. It will be observed that the bushing and its lining does not embrace the ball 26 closely adjacent the flat surface of the latter, but is slightly spaced therefrom so that lubricant in the void 39 will make contact with the marginal portion of the lining 40.

The embodiment of the invention shown in Fig. 6 comprises a ball element 42, a housing element 43, and a flexible rubber bushing element 44. The ball element has a flat side similar to those previously described, and diametrically opposite the flat side is integrally formed with a threaded stud or shank 45 for attachment to one of a pair of elements (not shown) that are connected by the joint. The housing element 43 is composed of a half-round metal rod that is bent into the shape of a circular loop of larger inside diameter than the diameter of the ball element 42, the flat sides of the rod being brought into face-to-face relation to complete the loop, the latter being permanently retained in shape by having its ends welded to the end of a rod 46 that constitutes one of the elements pivotally connected by the joint.

Molded and vulcanized within and to the loop of the housing element 43 is the bushing element 44, the same comprising an interiorly formed socket in which the ball 42 is receivable. Said socket is complemental to the shape of the ball, except the flat side and the shank portion 45 thereof, the axis of the spherical portion of the socket lying in the central plane of the housing 43. Furthermore, the dimensions of the socket are somewhat smaller than the ball so that when the latter is mounted in the socket, the rubber of the bushing is under compressive stress because of its confinement by the housing member. The socket in the bushing has a single flared orifice 48 that is somewhat smaller in diameter than the ball 42, so as to admit the ball to said socket with a "snap" fit. Opposite the flat side of the ball the socket is so shaped that the wall thereof stands in spaced relation to the ball and thus provides a void or recess 49 within the bushing. The socket in the bushing has a facing of flexible fabric 50 vulcanized thereto which facing extends onto the surface of the flared orifice 48, but is omitted from the surface of the void 49, said fabric being impregnated with a suitable viscous lubricant. A reserve supply of said lubricant is deposited in the recess 49 at the time the joint is assembled, which supply will come into contact with the fabric facing 50 whenever the ball is rocked in the socket, thus assuring permanent lubrication of said facing.

It will be noted that in each embodiment of the invention, the rubber bushing is a one-piece structure, as also is the flexible fabric lining thereof, and that bushing and lining are integrally bonded to each other by vulcanization. The arrangement is such as to achieve uniformity of operation, and to prevent escape of lubricant from the bushing lining.

Other modifications may be resorted to without departing from the spirit of the invention, or the scope thereof as defined by the appended claims.

I claim:

1. An insulating and pivotal joint comprising an inner spherical bearing member, a one-piece resilient rubber bushing enveloping said spherical member and having a fabric lining bonded thereto and in contact with said spherical member and an outer housing comprising a stamped metal part formed into a loop and tightly encompassing said bushing so as to exert compressive stress thereon.

2. An insulating and pivotal joint comprising an inner spherical bearing member, a resilient one-piece rubber bushing enveloping said spherical member and having a one-piece fabric lining bonded thereto and in contact with said spherical member, and an outer housing comprising a stamped metal part formed in a loop and encompassing said bushing, said loop having inturned margins to prevent axial displacement of said spherical bearing member with relation to said outer housing and to impart compressive stress to said bushing.

3. An insulating and pivotal joint comprising an inner spherical bearing member, a one-piece bushing of resilient rubber composition enveloping said member and integrally formed with a flexible fabric lining in contact with said spherical member, and an outer housing comprising a stamped metal part formed into a loop encompassing said bushing, the smallest diameter of the loop being larger than the outside diameter of the spherical member, the bushing having an opening therein formed with a flared orifice of smaller diameter than the diameter of the spherical member to enable the latter to be inserted readily in the bushing by way of said opening with a "snap" fit.

4. An insulating and pivotal joint comprising an inner substantially spherical member, a one-piece bushing of resilient material substantially enveloping said spherical member and formed with a lubricated fabric lining in contact with the spherical member, said bushing formed with an enclosed recess confronting the spherical member and adapted to receive a reserve supply of lubricant, said fabric lining extending to said recess so as to have contact with lubricant therein, and a housing encompassing said bushing.

5. An insulating and pivotal joint comprising an inner substantially spherical bearing member, a ring-shaped one-piece bushing of resilient material encircling said spherical member and having a lubricated fabric lining in contact with the spherical member, an outer housing comprising a metal part formed into a loop encompassing said bushing, said housing having an inturned flange on one end thereof overlying an end of said bushing, and a metal disc closing the other end of the housing, said disc engaging a portion of said bushing to put the latter under compressive stress, and closing a recess in the structure contiguous with the spherical member, in which recess a reserve supply of lubricant may be located.

6. A combination as defined in claim 5 whereof the fabric lining of the bushing extends into the recess in the structure so as to have contact with the lubricant therein.

7. An insulating and pivotal joint comprising an inner substantially spherical member, a one-piece bushing of resilient material substantially enveloping said spherical member and formed with a lubricated fabric lining in contact with the spherical member, and a housing encompassing said bushing, the assembled joint having closure means extending across one side of said bushing and forming an enclosed recess confronting the spherical member and adapted to receive a reserve supply of lubricant, said fabric lining extending to said recess so as to have contact with lubricant therein.

ROY W. BROWN.

REFERENCES CITED

The following references are of record in the file of this patent:

UNITED STATES PATENTS

| Number | Name | Date |
| --- | --- | --- |
| 1,828,891 | Crawford et al. | Oct. 27, 1931 |
| 2,236,062 | Katcher | Mar. 25, 1941 |
| 2,283,440 | Hufferd | May 19, 1942 |
| 2,274,417 | Katcher | Feb. 24, 1942 |
| 1,868,818 | Eksergian | July 26, 1932 |
| 1,909,100 | Geyer | May 16, 1933 |
| 2,216,987 | Rose | Oct. 8, 1940 |
| 1,828,358 | Chryst | Oct. 20, 1931 |
| 1,989,116 | Strauss | Jan. 29, 1935 |
| 1,923,414 | Benjamin | Aug. 22, 1933 |
| 2,350,398 | Hufferd | June 6, 1944 |

FOREIGN PATENTS

| Number | Country | Date |
| --- | --- | --- |
| 128,693 | Austria | June 10, 1932 |